(12) United States Patent
Danielsson

(10) Patent No.: US 8,268,451 B2
(45) Date of Patent: Sep. 18, 2012

(54) CHEMICAL PROTECTIVE GARMENT WITH ADDED FLASH FIRE PROTECTION

(75) Inventor: Pontus Danielsson, Ystad (SE)

(73) Assignee: Ansell Protective Solutions AB, Trelleborg (SE)

( * ) Notice: Subject to any disclaimer, the term of this patent is extended or adjusted under 35 U.S.C. 154(b) by 0 days.

(21) Appl. No.: 13/358,867

(22) Filed: Jan. 26, 2012

(65) Prior Publication Data

US 2012/0137415 A1 Jun. 7, 2012

Related U.S. Application Data

(63) Continuation of application No. 12/081,093, filed on Apr. 10, 2008.

(51) Int. Cl.
*B32B 27/04* (2006.01)
*B32B 27/12* (2006.01)
*B32B 27/30* (2006.01)
*A62B 17/00* (2006.01)

(52) U.S. Cl. ............... 428/476.3; 428/474.4; 428/476.9; 428/500; 428/515; 428/516; 428/517; 428/518; 428/519; 428/520; 428/521; 428/522; 428/523; 428/920; 428/921; 422/85; 422/86; 422/126; 422/128; 422/129; 422/136; 422/146; 422/148; 422/164; 422/168; 422/286; 422/288; 422/293; 422/301; 2/456; 2/457; 2/458

(58) Field of Classification Search .......................... None
See application file for complete search history.

(56) References Cited

U.S. PATENT DOCUMENTS

| | | | | |
|---|---|---|---|---|
| 3,890,275 | A * | 6/1975 | Golborn et al. ............... | 524/104 |
| 3,895,161 | A | 7/1975 | Golborn et al. | |
| 4,190,685 | A | 2/1980 | Hart et al. | |
| 4,308,882 | A * | 1/1982 | Pusch et al. ..................... | 135/93 |
| 4,502,153 | A * | 3/1985 | Lapedes et al. .................... | 2/81 |
| 4,583,247 | A * | 4/1986 | Fingerhut et al. ................... | 2/69 |
| 4,770,927 | A | 9/1988 | Effenberger et al. | |
| 4,855,178 | A * | 8/1989 | Langley ........................ | 442/398 |
| 4,868,041 | A | 9/1989 | Yamagishi et al. | |
| 4,869,947 | A | 9/1989 | Kirayoglu | |
| 4,900,613 | A | 2/1990 | Green | |
| 4,920,000 | A * | 4/1990 | Green ........................... | 442/189 |
| 5,015,522 | A * | 5/1991 | McCullough et al. ...... | 428/312.2 |
| 5,119,515 | A | 6/1992 | Altinger | |
| 5,223,334 | A | 6/1993 | Green | |
| 5,356,666 | A * | 10/1994 | Jackson et al. ................. | 427/307 |
| 5,626,947 | A | 5/1997 | Hauer et al. | |
| 5,948,708 | A | 9/1999 | Langley | |
| 6,713,411 | B2 | 3/2004 | Cox et al. | |
| 6,792,625 | B2 * | 9/2004 | Hexels .............................. | 2/457 |
| 6,800,367 | B2 | 10/2004 | Hanyon et al. | |
| 7,065,950 | B2 | 6/2006 | Zhu et al. | |
| 7,196,023 | B2 * | 3/2007 | Langley et al. ............... | 442/131 |
| 7,284,283 | B2 | 10/2007 | Mack et al. | |
| 2005/0076541 | A1 | 4/2005 | von Blucher | |
| 2009/0255039 | A1 * | 10/2009 | Danielsson ....................... | 2/458 |

FOREIGN PATENT DOCUMENTS

WO WO 89/10840 11/1989

OTHER PUBLICATIONS

Jeffrey O. Stull, "Understanding NFPA 1991 . . . " International Personnel Protection, Inc.
Jeffrey O. Stull, "Differences in Certified NFPA 1991 chemical protective suits," Homepage of Trelleborg Protective Products.
Jeffrey O. Stull, "NFPA 1991 and 1992 Synopsis." Homepage of Trelleborg Protective Products.

* cited by examiner

*Primary Examiner* — Vivian Chen
(74) *Attorney, Agent, or Firm* — Harness, Dickey & Pierce, P.L.C.

(57) ABSTRACT

A material intended for personal protective equipment, such as a suit for escaping chemicals or a flash fire is disclosed, wherein the material includes at least four different layers, the layers being: an outer first layer of a material comprising at least one polymer, which material is self-extinguishing; a second layer of a fiber material, which fiber material is self-extinguishing; a third layer being adhesive; and an inner fourth layer being a barrier laminate. All of the at least four different layers individually are attached to layers located next to them.

34 Claims, No Drawings

CHEMICAL PROTECTIVE GARMENT WITH ADDED FLASH FIRE PROTECTION

CROSS-REFERENCE TO RELATED APPLICATIONS

This application is a continuation of and claims priority under 35 U.S.C. §§120/121 to U.S. patent application Ser. No. 12/081,093, filed on Apr. 10, 2008. The disclosure of the above application is incorporated herein by reference.

FIELD OF THE INVENTION

The present invention relates to a material intended for personal protective equipment and specifically to a protective garment or suit being made essentially of such a material.

BACKGROUND OF THE INVENTION

Different materials for use in the production of personal protective equipment (PPE), such as protective garments or suits, are known. The properties of such materials are often evaluated with reference to different standards, such as according to the European harmonised standards that are used to determine compliance with the PPE directive 89/686/EEC for CE marking (e.g. EN 943-1 and EN 943-2) as well as the American standards set by NFPA (the National Fire Protection Association), NFPA 1991, for vapour protective clothing, which is the higher level of chemical protection, and NFPA 1992, for liquid-splash protective clothing, which consequently is considered to be a lower level of chemical protection. An example of such an important property is resistance against chemical permeation, which e.g. is evaluated with tests performed according to EN 374-3 and ASTM F 739, where the breakthrough time in minutes is determined for different chemicals. Other important properties are the actual material properties, such as abrasion resistance, flex cracking resistance, tear resistance, tensile strength, burst strength, puncture resistance, seam strength (of a suit), resistance to ignition and flammability resistance. All of these material properties are also evaluated according to specific standardised methods.

Below, NFPA 1991 will be discussed in more detail. Much of the information has been extracted from three different references, namely 1) "Understanding NFPA 1991" (Jeffrey O. Stull, International Personnel Protection, Inc.), 2) "Differences in Certified NFPA 1991 chemical protective suits" (Jeffrey O. Stull, International Personnel Protection, Inc.), and 3) the article "NFPA 1991 and 1992 synopsis" from the homepage of Trelleborg Protective Products.

NFPA 1991 imposes a difficult set of performance criteria for materials, namely chemical resistance against a broad range of chemicals (permeation resistance), physical hazard resistance/durability, and flame resistance. For e.g. the Environmental Protection Agency's Level A entries where hazards can be extreme or unknown, it is a further requirement that the chemical protective suits be able to offer protection against several types of exposures. Suits must not only prevent the permeation of chemicals or chemical mixtures, they must also resist rough physical environments, and not create additional hazards to the wearer. According to NFPA 1991, the suit should e.g. resist ignition and if it does ignite, self extinguish when removed from the flame or heat source. Accordingly, NFPA 1991 sets minimum criteria that have to be met, such as e.g. With reference to permeation resistance, but also states additional criteria, such as e.g. flash fire escape protection.

The only way to recognize a chemical protective suit that has been certified to NFPA 1991 is to examine the product label. Certified suits must have a product label that states that the suit meets the requirements and is certified to NFPA 1991. In addition to provide product information (e.g. the manufacturer identification and the model number), the label must include the mark of the third-party certification organization. To be certified, chemical protective suits must be certified by a independent certification organization, such as the Safety Equipment Institute or the Underwriter Laboratory. The certification organization's mark on the label is an indication that the product has been certified to the respective edition of the NFPA standard. The manufacturer is also required to state on the product label all items or parts (e.g., overcovers) that are required to provide a fully-compliant chemical protective ensemble.

Below, NFPA 1991 is explained in general terms. Some of the important tests performed according to NFPA 1991 are also summarised.

NFPA 1991 Standard on Vapor-Protective Ensembles for Hazardous Materials Emergencies (2005 Edition)

NFPA 1991 defines an ensemble consisting of a suit with attached gloves that totally encapsulates the wearer and his or her breathing apparatus. Ensembles are frequently configured with an overcover, outer gloves, and outer boots in order to meet the requirements of the standard. However, some products can achieve these requirements without these extra layers.

NFPA 1991 establishes some design requirements. Ensembles must be provided in a minimum of four sizes and must have protective, inverted pockets over exhaust valves. Gloves and footwear are subject to minimum length and height requirements, respectively.

Performance requirements include:
Inflation of ensembles to determine integrity against gas penetration and a "shower-like" test for demonstrating integrity of clothing against liquid penetration.
Permeation testing of suit, visor, glove, and footwear materials and their seams against a battery of 21 industrial chemicals to demonstrate resistance against a broad range of industrial chemicals, where the battery contains gases and liquids representing different classes of chemicals. These chemicals are presented below.
Burst strength, puncture/tear resistance, low temperature performance, abrasion resistance, and flex fatigue testing of suit, glove, and footwear materials.
Breaking strength testing for seams and closures.
Leakage and mounting strength testing of exhaust valves.
Tests for evaluating the functional use of the ensemble and dexterity of gloves.

NFPA 1991 also includes optional criteria for liquefied gas protection and flash fire escape protection. Additional criteria are provided for each of the certification options. Product labels must clearly indicate which options apply to the specific ensemble. The primary purpose of NFPA 1991 is to define requirements that isolate the wearer from a surrounding hazardous chemical environment.

Below, some of the important tests for NFPA 1991 certification are given.

Flame Resistance

The test involves suspending a folded edge of the material over a methane flame in a two-part exposure. The first exposure is for 3 seconds and is intended to represent incidental flame contact. During this exposure that material cannot ignite. If it does, the material fails the test. The same material specimen is then exposed for an additional 12 seconds. While ignition is permitted, the material can burn no more than 10 seconds and the burn distance cannot exceed 4 inches (10 centimeters). The second exposure is intended to demonstrate the self—extinguishing characteristics of the material. In addition, NFPA 1991 does not permit the material to melt as evidenced by dripping.

Abrasion Resistance Test

In the abrasion test, an 80-grit sandpaper is placed on a curved drum. The material sample is clamped in a holder under tension and pressure on top of the drum and the drum oscillates back and forth to abrade the specimen. In NFPA 1991, a total of 25 cycles of abrasion are used. Separate specimens are then cut from the centre of the abraded area and tested for chemical permeation resistance against each of the 21 industrial chemicals in the prescribed chemical battery. The material cannot show permeation to any of the chemicals within a 1-hour period.

Permeation Test

The permeation tests for NFPA 1991 are performed according to ASTM 739 with a breakthrough criterion of 0.1 $\mu g/cm^2 *min$. The different 21 industrial chemicals tested in accordance with NFPA 1991 are listed below.

---

Acetone
Acetonitrile
Ammonia, anhydrous (gas)
1,3-Butadiene (gas)
Carbon Disulfide
Chlorine (gas)
Dichloromethane
Diethylamine
Dimethylformamide
Ethyl Acetate
Ethylene Oxide (gas)
Hexane
Hydrogen Chloride (gas)
Methanol
Methyl Chloride (gas)
Nitrobenzene
Sodium Hydroxide
Sulfuric Acid
Tetrachloroethylene
Tetrahydrofuran
Toluene

---

When tested in accordance to the European standard EN 943-2, the tests are performed according to EN 374-3 with a breakthrough criterion of 1.0 $\mu g/cm^2 *min$. In the European standard, hepane is tested instead of hexane.

Many of the materials used today for protective garments are built up by different layers in a matrix. By combining different material layers in a matrix it is possible to achieve different important properties, e.g. a protection against specific chemicals at the same time as a abrasion resistance and puncture resistance. Layers comprising polymers or rubbers in such matrices are often used for their material properties as well as their permeation resistance against some chemicals.

One example of a multilayer chemical barrier material is disclosed in the international patent application WO 89/10840. The multilayer chemical barrier material is a composite multilayer material comprising a base sheet of material having internal open spaces, a first multilayer film sheet laminated to one face thereof and a second multilayer film sheet laminated to its opposite face, wherein said first multilayer film sheet comprises a film of ethylene vinyl alcohol, a film layer of nylon laminated to each face thereof, and an outer film of heat-sealable polyethylene, and wherein said second multilayer film sheet comprises a film of polyvinylidine chloride having a film of ethylene vinyl acetate laminated to the inner face thereof and a film of heat-sealable polyethylene laminated to its outer face. To adhere the first and second multilayer films to the base sheet, layers of adhesive are provided in between these layers. The material is said to show resistance to breakthrough to at least eight hours for the chemicals listed on the ASTM F1001, which is a list used according to NFPA 1991 for evaluation of chemical breakthrough resistance according to the method ASTM F 739. An evaluation of a type example of a suit which could be made of a material according to WO 89/10840 is shown in Table 1 below, where this suit is stated as the generic level A suit.

As mentioned however, to evaluate materials for use in PPE, such as protective garments or suits, today, the American standard NFPA 1991 is to be used for American certification. If a suit which e.g. comprises a composite multilayer material according to WO 89/10840, that is the generic level A suit, would be tested according to the tests specified for NFPA 1991, this suit would neither meet the basic requirements, such as for e.g. flex cracking resistance, abrasion resistance, and flammability resistance, nor the optional requirements, such as for e.g. flash fire escape protection. Another problem for such a suit is the limited use thereof. This suit should normally be disposed after one single exposure, rendering an expensive solution for users having to use such a suit more than once.

Moreover, to meet even the basic requirements for suits like the generic level A suit according to Table 1 below, an overcover suit has to be worn outside of these suits. This is a complicated solution for the end user due to the simple fact that they have to use two different suits in the right way at the same time. Another problem is the fact that some users may believe that the overcover or outer cover suit is optional for specific situations, while it in fact should be seen as an integral part of the suit system to meet even the minimum requirements of NFPA 1991. The problem with price in relation to number of uses is great for these 2 suits-systems as they normally are disposed in full after one single exposure.

There exists other chemical protective suit types, additionally to the generic level A suit according to Table 1 below, which are aiming at meeting the requirements according to NFPA 1991. One example of a material for such another suit is a 3 layer composite with 2 barrier films, wherein the composite is made of non-woven aramid fibers and polytetrafluoroethylene (PTFE). The PTFE is applied as a cast film providing a protective layer. One problem with this type of material and a suit made of such a material, when tested, is the poor mechanical strength, such as e.g. the low burst strength and low seam breaking strength. The poor mechanical strength properties of a suit made of such a material makes it prone to e.g. seam leakage and other mechanical damage. In such exposure events there is an evident risk for permeation of chemicals when reusing such a suit in a contaminated area and hence a suit made of such a material may and sometimes should be disposed after one single exposure. These disadvantages can be seen in Table 1 below for the alternative concept suit, which is one type of such a suit.

In other words, there is a need for materials for PPE, such as for suits and garments, which meet all of the requirements today, such as according to NFPA 1991, both in terms of the minimum basic requirements and the optional requirements, as well as according to the European harmonised standards that are used to determine compliance with the PPE directive 89/686/EEC for CE marking (e.g. EN 943-1 and EN 943-2). These materials should preferably at the same time have high values with reference to mechanical strength and durability amongst others. As an example, there is a need for a material for PPE which has a high protection against permeation of chemicals. i.e. the chemicals usually tested in standard tests for materials intended for protective garments, and which at the same time yields a high protection against flash fire escape and heat and flame as well as provides desired material properties, such as e.g. a high abrasion resistance, burst strength and puncture resistance. As another example, there is a specific need for protective suits made of such a preferred material as stated above and which are reusable.

SUMMARY OF THE INVENTION

One object of the present invention is thus to provide a material intended for PPE, which material meets all the requirements of e.g. NFPA 1991, both the basic requirements as well as the optional requirement of flash fire escape, and at the same time, in comparison to known materials for PPE, yields a combination of high protection against chemicals, e.g. the once evaluated in NFPA 1991, good mechanical strength and long durability.

This objective is achieved by a material according to present invention, which material comprises at least four different layers, said layers being:
 an outer first layer of a material comprising at least one polymer, which material is self-extinguishing;
 a second layer of a fiber material, which fiber material is self-extinguishing;
 a third layer being adhesive; and
 an inner fourth layer being a barrier laminate;
wherein all at least four different layers individually are attached to layers located next to them.

EXPLANATIONS OF IMPORTANT TERMS AND EXPRESSIONS

By the term "attached" is herein meant that the material is of a multilayered structure. The different layers are thus adhered or affixed to each other in the given order so that the finished material in fact is one material or matrix comprising several different layers.

By the term "barrier laminate" is meant a laminate which function as a barrier for chemicals, which in this case implies that the barrier laminate is a non-rubber material.

By the expression "a (fiber) material which is self-extinguishing" is herein meant a (fiber) material which does not support burning of the (fiber) material or a (fiber) material that burns only slowly, i.e. the (fiber) material self-extinguishes when it is drawn out from a flame.

Below, specific embodiments of the present invention will be described in more detail.

DETAILED DESCRIPTION OF THE INVENTION

As mentioned above, the material according to the present invention comprises at least four different layers, said layers being:
 an outer first layer of a material comprising at least one polymer, which material is self-extinguishing;
 a second layer of a fiber material, which fiber material is self-extinguishing;
 a third layer being adhesive; and
 an inner fourth layer being a barrier laminate;
wherein all at least four different layers individually are attached to layers located next to them.

Due to the design of the material according to the present invention, the material has advantages in terms of the combination of properties which are important for material for PPE articles in comparison to materials known on the market today. This can e.g. be seen in Table 1 below where one example of a suit made of a material according to the present invention is compared with other known suit types. The material according to the present invention has an enhanced property combination of high mechanical strength, high chemical protection, is durable and is usable in contaminated locations where there is an additional risk for flames and flash avers.

The outer first layer of a material comprising at least one polymer, which material is self-extinguishing, can be made of different materials. According to one specific embodiment of the present invention, the outer first layer of the present invention is a material comprising at least one compound chosen from the group consisting of polyvinyl chloride, chlorosulphonated polyethylene, chlorinated polyethylene, fluoro rubber, butyl rubber and chloroprene rubber.

According to another specific embodiment, the outer first layer comprises two separate rubber material layers and wherein a butyl rubber material layer is inserted and attached between an outer fluoro rubber material layer and the second layer.

As explained above, the term "self-extinguishing" refers to materials which does not support burning of the materials or materials that burn only slowly. The second layer of the present invention is a fiber material, which is self-extinguishing. In this case one could say that both temperature resistance as well as flame retardant ability may be key features of the fiber material. A common mistake is to confuse these features with each other. Flame retardant ability is generally measured by the Limiting Oxygen Index, LOI. LOI, basically, is the amount of oxygen needed in the atmosphere to support combustion. Fibers with a LOI greater than 25 are said to be flame retardant, which means that there must be at least 25% oxygen present in order for them to burn. With a broad interpretation of the LOI, one could say that a LOI greater than 21 implies a flame retardant ability due to the fact that air contains 21% oxygen. The LOI of a fiber material can be influenced by e.g. adding a flame retardant finish to the fiber material. Another feature of importance for the flame retardant ability of a fiber material layer is the density or tightness of the weave of the fiber material. This is e.g. measured by the number of ends and picks per unit of length of the fiber material. Therefore, according to one specific embodiment of the present invention, the second layer is a fabric having at least 175 ends/10 cm and 175 picks/10 cm, respectively, and having a LOI (Limiting Oxygen Index) greater than 25. There is of course fiber materials having a LOI which is significantly higher than 25 and fiber material layers having significantly higher values than 175 ends/10 cm and 175 picks/10 cm, respectively, which also are possible, and sometimes preferred, to use as the material of the second layer of the present invention.

The third adhesive layer of the present invention may comprise some of the same compounds which may be comprised in the first layer of the present invention. Therefore, according to one specific embodiment of the present invention, the third layer of the present invention is a material comprising at least one compound chosen from the group consisting of polyvinyl chloride, butyl rubber and chloroprene rubber. The third layer may however also consist of other typical adhesive materials used for these type of applications.

As mentioned, the inner fourth layer of the present invention is a barrier laminate, which means that the inner fourth layer is a barrier for chemicals and is a non-rubber material. According to one specific embodiment of the present invention, the inner fourth layer being a barrier laminate is a multilayered film comprising thermoplastics.

All of the layers of the present invention may be self-extinguishing, but this is not necessary for the third adhesive layer and the inner fourth layer. A material where all of the layers are self-extinguishing is of course a more expensive material than a material where only the outer first and second layers are self-extinguishing. As said, all of the layers may be self-extinguishing, but the inner fourth layer being a barrier laminate is in fact normally not self-extinguishing.

Below, specific embodiment combinations of the present invention will be described in more detail.

According to one specific embodiment of the present invention, the outer first layer is a material comprising at least one compound chosen from the group consisting of polyvinyl chloride, chlorosulphonated polyethylene, chlorinated polyethylene, fluoro rubber, butyl rubber and chloroprene rubber, the second layer is a fabric having at least 175 ends/10 cm and 175 picks/10 cm, respectively, and having a LOI greater than 25, the third layer is a material comprising at least one compound chosen from the group consisting of polyvinyl chloride, butyl rubber and chloroprene rubber, and the inner fourth layer being a barrier laminate is a multilayered film comprising thermoplastics.

According to another specific embodiment, the outer first layer comprises two separate rubber material layers where a butyl rubber material layer is inserted and attached between an outer fluoro rubber material layer and the second layer, the second layer is a fabric having at least 175 ends/10 cm and 0.175 picks/10 cm, respectively, and having a LOI greater than 25, the third layer is a material comprising at least one compound chosen from the group consisting of polyvinyl chloride, butyl rubber and chloroprene rubber, and the inner fourth layer being a barrier laminate is a multilayered film comprising thermoplastics.

According to yet another specific embodiment of the present invention, the outer first layer is a chloroprene rubber material, the second layer is a fabric having at least 175 ends/10 cm and 175 picks/10 cm, respectively, and having a LOI greater than 25, the third layer is a chloroprene rubber material, and the inner fourth layer being a barrier laminate is a multilayered film comprising thermoplastics.

As mentioned, the fiber material of the second layer may comprise different components having different possible ranges of the LOI. According to one specific embodiment of the present invention, the second layer comprises at least one Meta-aramid having a LOI of 25-35, at least one Para-aramid having a of 25-30, at least one poly-phenylene benzobisoxazole compound having a LOI of 65-75, at least one polybenzimidazole compound having a LOI of 35-45, at least one polyimide fiber material having a LOI of 35-45, or at least one carbon precursor fiber material having a LOI of 55-75, or a combination thereof.

The material of the present invention is intended for PPE, such as e.g. protective suits and garments. According to one embodiment of the present invention there is provided a protective suit comprising a material according to present invention. This implies that most of such a suit is made of a material according to present invention, normally except for e.g. the boots, the gloves and the visor.

As explained in detail above, NFPA 1991 is an important standard for evaluation and certification of protective suits. According to one specific embodiment of the present invention, there is provided a protective suit comprising a material according to the present invention, where said suit meets all of the basic requirements according to NFPA 1991.

One of the important criteria in the NFPA 1991 is the chemical protection. The material according to present invention meets all of the requirements according to NFPA 1991 in this sense, but also exceeds the minimum requirements significantly. Therefore, according to another embodiment of the present invention, there is provided a protective suit comprising a material according to the present invention, said suit meeting all of the basic requirements according to NFPA 1991 and said suit having a minimum breakthrough time of at least 480 minutes for the chemicals according to NFPA 1991 when tested in accordance with EN 374-3 and ASTM F 739 with breakthrough criterion of 0.1 $\mu g/cm^2 \ast min$. According to NFPA 1991, the chemical protection against additional chemical/biological terrorism agents are also tested according to a modified version of ASTM F 739, as described in NFPA 1991. These agents are mustard gas (HD) and sarine (GB). In this sense, it is important to understand that e.g. the specific embodiment enclosed above, where the suit has a minimum breakthrough time of at least 480 minutes for the chemicals according to NFPA 1991, also embodies such an approved protection against the chemical/biological terrorism agents listed above, when tested in accordance with this modified version of ASTM F 739.

Other important key features according to NFPA 1991 are the ones measured in relation to the mechanical strength of a material. Also in this sense, the material according to present invention shows enhanced properties. Therefore, according to another specific embodiment of the present invention, there is provided a protective suit comprising a material according to the present invention, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 $\mu g/cm^2 \ast min$ and said suit having a breaking strength (grab) of at least 800 N according to ASTM D 751, a burst strength of at least 1000 N according to ASTM D 751 and a seam breaking strength of at least 15 kN/m according to ASTM D 752.

Furthermore, according to one specific embodiment, there is provided a protective suit comprising a material according to the present invention, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 $\mu g/cm^2 \ast min$, said, suit having a breaking strength (grab) of at least 800 N according to ASTM D 751, a burst strength of at least 1000 N according to ASTM D 751 and a seam breaking strength of at least 15 kN/m according to ASTM D 752 and said suit having a flexing cracking resistance of at least 15000 cycles according to ISO 7854 method B. A suit made of a material may e.g. have a significantly better flexing cracking resistance, such as above 40000 cycles, when tested according to ISO 7854 method B. This is shown in Table 1 below for the one example of a suit made of a material according to the invention.

As mentioned above, the material according to the present invention shows excellent chemical protection properties. According to one specific embodiment of the present invention, there is provided a protective suit comprising a material according to the present invention, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 $\mu g/cm^2 \ast min$ and said suit passing the permeation resistance test which lasts more than 180 minutes after flexing and abrasion according to NFPA 1991.

There are, as mentioned, optional requirements evaluated in the NFPA 1991. The material according to the present invention shows both excellent properties evaluated for the basic requirements of the NFPA 1991, that is in relation to e.g. mechanical strength, durability and chemical protection, as well as high flame retardant ability. According to one specific embodiment of the present invention, there is provided a chemical and flash fire escape protective suit comprising a material according to the present invention, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min and said suit passing the flame test according to ASTM F 1358 and the garment material flame test and the whole suit flash over test according to the NFPA 1991 optional flash fire escape.

Moreover, according to another specific embodiment, there is provided a chemical and flash fire escape protective suit comprising a material according to the present invention, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min, said suit passing the permeation resistance test which lasts more than 180 minutes after flexing and abrasion according to NFPA 1991 and said suit passing the flame test according to ASTM F 1358 and the garment material flame test and the whole suit flash over test according to the NFPA 1991 optional flash fire escape.

As is evident by the description above, the material according to the present invention is intended for PPE and the production of PPE. According to one embodiment of the present invention, there is therefore provided the use of a material according to the present invention, for the production of personal protective equipment, such as for the production of a protective suit or garment.

COMPARISON EXAMPLE

In Table 1 below, one example of a suit made of material according to the present invention is compared with two different known suit types, which are the generic level A suit and alternative concept suit, which both are related to above.

TABLE 1

| Property | Example of a protective suit according to the invention | Generic level A suit * | Alternative concept suit * |
|---|---|---|---|
| Mechanical strength | | | |
| Breaking strength (grab) ASTM D 751 | 1000N | 100-400N | NDA |
| Burst strength ASTM D 751 | 1250N | NDA | 400N |
| Puncture propagation tear resistance ASTM D 2582 | 75N | 100N | 95N |
| Seam breaking strength ASTM D 752 | 20 kN/m | NDA | 4 kN/m |
| Chemical protection | | | |
| Permeation breakthrough time (minutes) ASTM F 739 for ASTM F 1001 list of chemicals | >480 | >480 | >480 |
| Durability | | | |
| Flexing cracking resistance ISO 7854 method B (cycles) | >40 000 | <5000 | NDA |

TABLE 1-continued

| Property | Example of a protective suit according to the invention | Generic level A suit * | Alternative concept suit * |
|---|---|---|---|
| Permeation resistance (>180 min) after flexing and abrasion NFPA 1991 | Pass (>180 min) | Fail ** | Pass |
| Decontaminate and reuse? | Reusable | Disposable/ limited use | Disposable/ limited use |
| Flame/flash over | | | |
| Flame test, ASTM F 1358 | Pass | Fail ** | Pass |
| NFPA 1991 optional flash fire escape: garment material flame test | Pass | Fail ** | Pass |
| NFPA 1991 optional flash fire escape: whole suit flash over test | Pass | Fail ** | Pass |

\* The values are indications of the level of performance typically found on the US market.
\*\* An aluminised outer cover suit ("flash cover") is required to be worn to pass this requirement.
NDA = No data available.

As can be seen in Table 1, when comparing all of the different property types for one example of a suit according to present invention with the two other suit types, the suit according to present invention shows enhanced properties. Although some specific values might be somewhat better or the same for one of the other suits, such as for puncture propagation tear resistance according to ASTM D 2582, the overall values and the combination of the different properties are better for the suit according to the present invention.

In general, one could say that the properties related to flame/flash over and durability as well as some of the values related to the mechanical strength are much better for the suit according to the present invention in comparison to the generic level A suit. This generic level A suit must be worn together with an outer cover ("flash cover") to meet the requirements for flame/flash over and for the permeation resistance after 180 minutes after flexing and abrasion. Additionally, its flexing cracking resistance ability is nowhere near the flexing cracking resistance of a suit according to the present invention. In comparison to the alternative concept suit, the mechanical strength, such as the burst strength and the seam breaking strength, of the suit according to the present invention is much better.

Another important fact showing the advantage of a suit made of a material according to present invention is the fact that it is reusable after being used in a contaminated area. When such a suit has been decontaminated after such an exposure, then it is ready to be used again. This is also stated in Table 1 above. In contrast, the other two known suits showed in Table 1, that is the generic level A suit and the alternative concept suit, normally have to be disposed after one single exposure.

CONCLUSIONS

As mentioned, the material according to present invention is intended for PPE, such as for protective suits and garments. The material according to present invention shows enhanced combination protective properties in comparison to known such materials. As an example, a protective suit comprising a material according to present invention meets all of the basic requirements according to NFPA 1991, has enhanced properties related to the mechanical strength, chemical protection and durability, and meets the optional requirements for flash fire escape according to NFPA 1991. Moreover, as showed in table 1, a suit made of a material according to the present invention is possible to reuse after being used in a contaminated area. A suit comprising a material according to the present invention is decontaminated after exposure, and is thus ready to be used again.

The invention claimed is:

1. A material intended for personal protective equipment, wherein said material comprises at least four different layers, said layers being:
   an outer first layer of a material comprising at least one compound chosen from the group consisting of polyvinyl chloride, chlorosulphonated polyethylene, chlorinated polyethylene, and chloroprene rubber, which material is self-extinguishing;
   a second layer of a fiber material, which fiber material is self-extinguishing;
   a third layer being adhesive; and
   an inner fourth layer being a barrier laminate;
wherein the first layer is attached to the second layer, which in turn is attached to the third layer, and wherein the third layer is attached to the inner fourth layer.

2. The material according to claim 1, wherein the second layer is a fabric having at least 175 ends/10 cm and 175 picks/10 cm, respectively, and having a LOI (Limiting Oxygen Index) greater than 25.

3. The material according to claim 1, wherein the third layer is a material comprising at least one compound chosen from the group consisting of polyvinyl chloride, butyl rubber and chloroprene rubber.

4. The material according to claim 1, wherein the inner fourth layer being a barrier laminate is a multilayered film comprising thermoplastics.

5. The material according to claim 1, wherein the outer first layer is a material comprising at least one compound chosen from the group consisting of polyvinyl chloride, chlorosulphonated polyethylene, chlorinated polyethylene, and chloroprene rubber, the second layer is a fabric having at least 175 ends/10 cm and 175 picks/10 cm, respectively, and having a LOI greater than 25, the third layer is a material comprising at least one compound chosen from the group consisting of polyvinyl chloride, butyl rubber and chloroprene rubber, and wherein the inner fourth layer being a barrier laminate is a multilayered film comprising thermoplastics.

6. A protective suit comprising the material according to claim 5.

7. A protective suit comprising the material according to claim 5, said suit meeting all of the basic requirements according to NFPA 1991.

8. A protective suit comprising the material according to claim 5, said suit meeting all of the basic requirements according to NFPA 1991 and said suit having a minimum breakthrough time of at least 480 minutes for the chemicals according to NFPA 1991 when tested in accordance with EN 374-3 and ASTM F 739 with breakthrough criterion of 0.1 $\mu g/cm^2$*min.

9. A protective suit comprising the material according to claim 5, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 $\mu g/cm^2$*min and said suit having a breaking strength (grab) of at least 800 N according to ASTM D 751, a burst strength of at least 1000 N according to ASTM D 751 and a seam breaking strength of at least 15 kN/m according to ASTM D 752.

10. A protective suit comprising the material according to claim 5, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 $\mu g/cm^2$*min, said suit having a breaking strength (grab) of at least 800 N according to ASTM D 751, a burst strength of at least 1000 N according to ASTM D 751 and a seam breaking strength of at least 15 kN/m according to ASTM D 752 and said suit having a flexing cracking resistance of at least 15000 cycles according to ISO 7854 method B.

11. A protective suit comprising the material according to claim 5, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 $\mu g/cm^2$*min and said suit passing the permeation resistance test which lasts more than 180 minutes after flexing and abrasion according to NFPA 1991.

12. A chemical and flash fire escape protective suit comprising the material according to claim 5, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 $\mu g/cm^2$*min and said suit passing the flame test according to ASTM F 1358 and the garment material flame test and the whole suit flash over test according to NFPA 1991 optional flash fire escape.

13. A chemical and flash fire escape protective suit comprising the material according to claim 5, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 $\mu g/cm^2$*min, said suit passing the permeation resistance test which lasts more than 180 minutes after flexing and abrasion according to NFPA 1991 and said suit passing the flame test according to ASTM F 1358 and the garment material flame test and the whole suit flash over test according to NFPA 1991 optional flash fire escape.

14. The material according to claim 1, wherein the outer first layer is a chloroprene rubber material, the second layer is a fabric having at least 175 ends/10 cm and 175 picks/10 cm, respectively, and having a LOI greater than 25, the third layer is a chloroprene rubber material, and wherein the inner fourth layer being a barrier laminate is a multilayered film comprising thermoplastics.

15. The material according to claim 14, wherein the second layer comprises at least one Meta-aramid having a LOI of 25-35, at least one Para-aramid having a LOI of 25-30, at least one poly-phenylene benzobisoxazole compound having a LOI of 65-75, at least one polybenzimidazole compound having a LOI of 35-45, at least one polyimide fiber material having a LOI of 35-45, or at least one carbon precursor fiber material having a LOI of 55-75, or a combination thereof.

16. A protective suit comprising the material according to claim 14.

17. A protective suit comprising the material according to claim 14, said suit meeting all of the basic requirements according to NFPA 1991.

18. A protective suit comprising the material according to claim 14, said suit meeting all of the basic requirements according to NFPA 1991 and said suit having a minimum breakthrough time of at least 480 minutes for the chemicals according to NFPA 1991 when tested in accordance with EN 374-3 and ASTM F 739 with breakthrough criterion of 0.1 µg/cm$^2$*min.

19. A protective suit comprising the material according to claim 14, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min and said suit having a breaking strength (grab) of at least 800 N according to ASTM D 751, a burst strength of at least 1000 N according to ASTM D 751 and a seam breaking strength of at least 15 kN/m according to ASTM D 752.

20. A protective suit comprising the material according to claim 14, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min, said suit having a breaking strength (grab) of at least 800 N according to ASTM D 751, a burst strength of at least 1000 N according to ASTM D 751 and a seam breaking strength of at least 15 kN/m according to ASTM D 752 and said suit having a flexing cracking resistance of at least 15000 cycles according to ISO 7854 method B.

21. A protective suit comprising the material according to claim 14, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min and said suit passing the permeation resistance test which lasts more than 180 minutes after flexing and abrasion according to NFPA 1991.

22. A chemical and flash fire escape protective suit comprising the material according to claim 14, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min and said suit passing the flame test according to ASTM F 1358 and the garment material flame test and the whole suit flash over test according to NFPA 1991 optional flash fire escape.

23. A chemical and flash fire escape protective suit comprising the material according to claim 14, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min, said suit passing the permeation resistance test which lasts more than 180 minutes after flexing and abrasion according to NFPA 1991 and said suit passing the flame test according to ASTM F 1358 and the garment material flame test and the whole suit flash over test according to NFPA 1991 optional flash fire escape.

24. The material according to claim 1, wherein the second layer comprises at least one Meta-aramid having a LOI of 25-35, at least one Para-aramid having a LOI of 25-30, at least one poly-phenylene benzobisoxazole compound having a LOI of 65-75, at least one polybenzimidazole compound having a LOI of 35-45, at least one polyimide fiber material having a LOI of 35-45, or at least one carbon precursor fiber material having a LOI of 55-75, or a combination thereof.

25. A protective suit comprising the material according to claim 1.

26. A protective suit comprising the material according to claim 1, said suit meeting all of the basic requirements according to NFPA 1991.

27. A protective suit comprising the material according to claim 1, said suit meeting all of the basic requirements according to NFPA 1991 and said suit having a minimum breakthrough time of at least 480 minutes for the chemicals according to NFPA 1991 when tested in accordance with EN 374-3 and ASTM F 739 with breakthrough criterion of 0.1 µg/cm$^2$*min.

28. A protective suit comprising the material according to claim 1, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min and said suit having a breaking strength (grab) of at least 800 N according to ASTM D 751, a burst strength of at least 1000 N according to ASTM D 751 and a seam breaking strength of at least 15 kN/m according to ASTM D 752.

29. A protective suit comprising the material according to claim 1, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min, said suit having a breaking strength (grab) of at least 800 N according to ASTM D 751, a burst strength of at least 1000 N according to ASTM D 751 and a seam breaking strength of at least 15 kN/m according to ASTM D 752 and said suit having a flexing cracking resistance of at least 15000 cycles according to ISO 7854 method B.

30. A protective suit comprising the material according to claim 1, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min and said suit passing the permeation resistance test which lasts more than 180 minutes after flexing and abrasion according to NFPA 1991.

31. A chemical and flash fire escape protective suit comprising the material according to claim 1, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min and said suit passing the flame test according to ASTM F 1358 and the garment material flame test and the whole suit flash over test according to NFPA 1991 optional flash fire escape.

32. A chemical and flash fire escape protective suit comprising the material according to claim 1, said suit meeting all of the basic requirements according to NFPA 1991, said suit having a minimum breakthrough time of at least 480 minutes for the chemicals according to NFPA 1991 when tested in accordance with EN 374-3 and ASTM F 739 with breakthrough criterion of 0.1 µg/cm$^2$*min, said suit passing the permeation resistance test which lasts more than 180 minutes after flexing and abrasion according to NFPA 1991 and said suit passing the flame test according to ASTM F 1358 and the garment material flame test and the whole suit flash over test according to NFPA 1991 optional flash fire escape.

33. A method, comprising:
using the material according to claim 1, for the production of personal protective equipment.

34. A method, comprising:
using the material according to claim 1, for the production of a protective suit.

\* \* \* \* \*